US011624630B2

(12) United States Patent
Robeson et al.

(10) Patent No.: US 11,624,630 B2
(45) Date of Patent: Apr. 11, 2023

(54) USING AUGMENTED REALITY TO PRESENT VEHICLE NAVIGATION REQUIREMENTS

(71) Applicant: International Business Machines Corporation, Armonk, NY (US)

(72) Inventors: Kyle D. Robeson, North York (CA); Steve McDuff, Markham (CA); Anthony Di Loreto, Markham (CA); Ben Z. Akselrod, Givat Shmuel (IL)

(73) Assignee: International Business Machines Corporation, Armonk, NY (US)

( * ) Notice: Subject to any disclaimer, the term of this patent is extended or adjusted under 35 U.S.C. 154(b) by 1095 days.

(21) Appl. No.: 16/274,218

(22) Filed: Feb. 12, 2019

(65) Prior Publication Data

US 2020/0256699 A1    Aug. 13, 2020

(51) Int. Cl.
*G01C 21/36* (2006.01)
*H04W 4/40* (2018.01)
(Continued)

(52) U.S. Cl.
CPC ....... *G01C 21/3697* (2013.01); *G01C 21/365* (2013.01); *G06T 19/006* (2013.01); *G08G 1/096791* (2013.01); *H04W 4/40* (2018.02)

(58) Field of Classification Search
CPC ............. G01C 21/3697; G01C 21/365; G06T 19/006; G08G 1/096791; G04W 4/40
(Continued)

(56) References Cited

U.S. PATENT DOCUMENTS 6,334,086 B1 * 12/2001  Park ............... G08G 1/0104
                                              701/119
6,564,147 B2 *  5/2003  Chen ............... G01C 21/26
                                              340/905

(Continued)

FOREIGN PATENT DOCUMENTS

CN    106915351 A  *  7/2017
CN    107521411 A    12/2017
(Continued)

OTHER PUBLICATIONS

"Good Driving in Quebec Means . . . ", retrieved from [https://saaq.gouv.qc.ca/en/tourists-and-newcomers/tourists/good-driving-in-quebec-means/] on Mar. 20, 2018.

(Continued)

*Primary Examiner* — Richard A Goldman
(74) *Attorney, Agent, or Firm* — Jeffrey S LaBaw; Anthony V England; Randy Tefeda

(57) ABSTRACT

In identifying vehicle navigation requirements using augmented reality, one vehicle determines that an event has occurred that concerns operation of the vehicle. The vehicle determines its current location, creates a notification message corresponding to navigation requirements matching the current location and the event, and sends the notification message. Another vehicle receives the notification message. In response, the other vehicle determines its current environment and a correlation between the navigation requirements and the current environment. An augmented reality system of the other vehicle displays alerts for the navigation requirements overlaid on a display of the current environment based on the correlation. I this manner, vehicle drivers are alerted to the navigation requirements applicable in particular locations or jurisdictions.

20 Claims, 4 Drawing Sheets

(51) Int. Cl.
*G06T 19/00* (2011.01)
*G08G 1/0967* (2006.01)

(58) Field of Classification Search
USPC .......................................................... 701/439
See application file for complete search history.

(56) References Cited

U.S. PATENT DOCUMENTS

| | | | | |
|---|---|---|---|---|
| 8,972,146 B2* | 3/2015 | Rothschild | ......... | G01C 21/3697 340/995.13 |
| 9,036,509 B1* | 5/2015 | Addepalli | ........... | H04L 43/0876 701/1 |
| 9,151,634 B2* | 10/2015 | Ann | ........ | G01C 21/36 |
| 9,679,487 B1* | 6/2017 | Hayward | ............ | G08G 1/0125 |
| 9,805,601 B1* | 10/2017 | Fields | ................... | G08G 1/166 |
| 9,983,013 B1* | 5/2018 | Krunic | ................ | G01C 21/3644 |
| 10,061,312 B1* | 8/2018 | Anderson | ............ | G05D 1/0055 |
| 10,284,317 B1* | 5/2019 | Sanchez | ................... | H04B 1/20 |
| 10,991,242 B2* | 4/2021 | Taylor | ..................... | H04Q 9/00 |
| 11,047,697 B2* | 6/2021 | Balakrishna | ....... | G01C 21/3484 |
| 2002/0027512 A1* | 3/2002 | Horita | ................ | G08G 1/09675 340/905 |
| 2004/0215373 A1* | 10/2004 | Won | ........................ | G08G 1/161 701/1 |
| 2005/0021224 A1* | 1/2005 | Gray | ................. | B60H 1/00771 340/436 |
| 2005/0146443 A1* | 7/2005 | Chen | ....................... | B60Q 1/444 340/815.45 |
| 2006/0031003 A1* | 2/2006 | Sun | ....................... | G08G 1/0965 340/995.13 |
| 2006/0087453 A1* | 4/2006 | Iwane | .............. | G08G 1/096725 381/1 |
| 2007/0005238 A1* | 1/2007 | Adachi | ................... | G01C 21/30 340/995.19 |
| 2007/0124063 A1* | 5/2007 | Kindo | .................. | G08G 1/096791 701/517 |
| 2009/0072997 A1* | 3/2009 | Shrum, Jr. | .............. | G08G 1/127 340/905 |
| 2010/0063954 A1* | 3/2010 | Anderson | ............ | G05D 1/0274 706/50 |
| 2013/0223686 A1* | 8/2013 | Shimizu | ................. | G08G 1/166 382/103 |
| 2014/0129132 A1* | 5/2014 | Yoshizu | ................ | G08G 1/0112 701/400 |
| 2014/0253326 A1* | 9/2014 | Cho | ........................ | H04W 4/90 340/539.11 |
| 2014/0354684 A1* | 12/2014 | Beckwith | ................ | G06F 3/011 345/633 |
| 2015/0066349 A1* | 3/2015 | Chan | .................. | G01C 21/3697 701/400 |
| 2016/0223350 A1* | 8/2016 | Lewis | .............. | G08G 1/096725 |
| 2016/0275796 A1* | 9/2016 | Kim | ........................ | G08G 1/161 |
| 2017/0025005 A1* | 1/2017 | Barth | .................... | H04N 23/635 |
| 2017/0116854 A1* | 4/2017 | Sugawara | ............ | G08G 1/0129 |
| 2017/0129496 A1* | 5/2017 | Li | ...................... | B60W 50/0097 |
| 2017/0282821 A1* | 10/2017 | Zych | ...................... | G06Q 50/30 |
| 2018/0004213 A1* | 1/2018 | Absmeier | ........... | B60W 30/0956 |
| 2018/0012492 A1* | 1/2018 | Baldwin | .......... | G08G 1/096741 |
| 2018/0040162 A1* | 2/2018 | Donnelly | ........... | G02B 27/0179 |
| 2018/0237027 A1* | 8/2018 | Lundsgaard | ...... | B60W 50/0098 |
| 2018/0286245 A1* | 10/2018 | Obaidi | .................. | G08G 1/0141 |
| 2018/0340664 A1* | 11/2018 | Yang | ..................... | F21S 41/365 |
| 2018/0342033 A1* | 11/2018 | Kislovskiy | ......... | G01C 21/3697 |
| 2018/0342165 A1* | 11/2018 | Sweeney | .............. | G08G 1/0112 |
| 2018/0357905 A1* | 12/2018 | Boss | .................... | B62D 15/028 |
| 2019/0077417 A1* | 3/2019 | Kleen | ................... | G06T 19/006 |
| 2019/0213881 A1* | 7/2019 | Bender | ............ | G08G 1/096775 |
| 2019/0225233 A1* | 7/2019 | Tod | ........................ | G06Q 10/04 |
| 2019/0280954 A1* | 9/2019 | Volos | .................. | H04L 43/0852 |
| 2020/0096360 A1* | 3/2020 | Pfeifle | ................ | G01C 21/3691 |
| 2020/0151611 A1* | 5/2020 | McGavran | ......... | G01C 21/3691 |
| 2020/0166620 A1* | 5/2020 | Emura | .................... | G01S 15/04 |
| 2020/0191588 A1* | 6/2020 | Park | .................. | G08G 1/096775 |
| 2020/0207358 A1* | 7/2020 | Katz | .................... | G01C 21/3697 |
| 2020/0256699 A1* | 8/2020 | Robeson | ................ | G01C 21/365 |
| 2020/0312136 A1* | 10/2020 | Mondello | ............. | H04L 9/3273 |
| 2021/0157312 A1* | 5/2021 | Cella | .................... | H04W 52/16 |
| 2021/0158701 A1* | 5/2021 | Cho | .................. | G08G 1/096716 |
| 2021/0323546 A1* | 10/2021 | Svensson | .......... | B60W 30/0956 |
| 2021/0403055 A1* | 12/2021 | Jeromin | ................ | H04W 4/024 |
| 2022/0144310 A1* | 5/2022 | Hong | .................. | B60W 50/16 |
| 2022/0204028 A1* | 6/2022 | Xu | ...................... | B60W 60/005 |

FOREIGN PATENT DOCUMENTS

| | | | | |
|---|---|---|---|---|
| CN | 110020504 A | * | 7/2019 | |
| CN | 110322728 A | * | 10/2019 | ........... G08B 25/002 |

OTHER PUBLICATIONS

"Stopping", The Official Ministry fo Transportation (MTO) Driver's Handbook, retrieved from [https://www.ontario.ca/document/official-mto-drivers-handbook/stopping#section-2], May 29, 2017.

Griggs, Brandon, CNN "Augmented-reality windshields and the future to driving", retrieved from [https://edition.cnn.com/2012/01/13/tech/innovation/ces-future-driving/index.html], Jan. 13, 2012.

Nowak, Peter, "Heads-up: Driving is about to be revolutionized", The Globe and Mail, retrieved from [https://www.theglobeandmail.com/globe-drive/culture/technology/augmented-reality-merges-into-vehiclewindshields/article35096455/], May 31, 2017.

Rose, Amy, et al., Lenovo, "Method for school buses to alert nearby drivers to stop", IP.com, No. IPCOM000234962D, Feb. 19, 2014.

* cited by examiner

USING AUGMENTED REALITY TO PRESENT VEHICLE NAVIGATION REQUIREMENTS

BACKGROUND

Laws exist that apply to driving around certain vehicles, such as school buses and emergency vehicles. For example, some laws set when and under what circumstances drivers are prohibited from passing the vehicle or set a minimum distance that drivers must stay away from the vehicle. In addition to the laws, safety suggestions may also apply. The specifics of these laws and suggestions vary by location or jurisdiction. For example, the laws of one state or province requires drivers to stop at least 20 meters away from a school bus when its red lights are flashing, while the laws of another state or province requires drivers to stop at least 50 meters away. However, drivers may not be familiar with the variations in the laws between locations, which can lead to inadvertent violations.

SUMMARY

Disclosed herein is a method for identifying vehicle navigation requirements using augmented reality, and a computer program product and system as specified in the independent claims. Embodiments of the present invention are given in the dependent claims. Embodiments of the present invention can be freely combined with each other if they are not mutually exclusive.

According to an embodiment of the present invention, a vehicle determines that the set of events concerning an operation of the vehicle has occurred. In response, the vehicle determines its current location and creates a notification message corresponding to a set of navigation requirements matching the current location of the second vehicle and the set of events. The vehicle then sends the notification message. Another vehicle receives the notification message from the vehicle. In response, the other vehicle determines a current environment for the other vehicle and determines a correlation between the set of navigation requirements and the current environment. An augmented reality system of the other vehicle displays a set of alerts for the set of navigation requirements overlaid on a display of the current environment based on the correlation.

DETAILED DESCRIPTION

Figure 1:
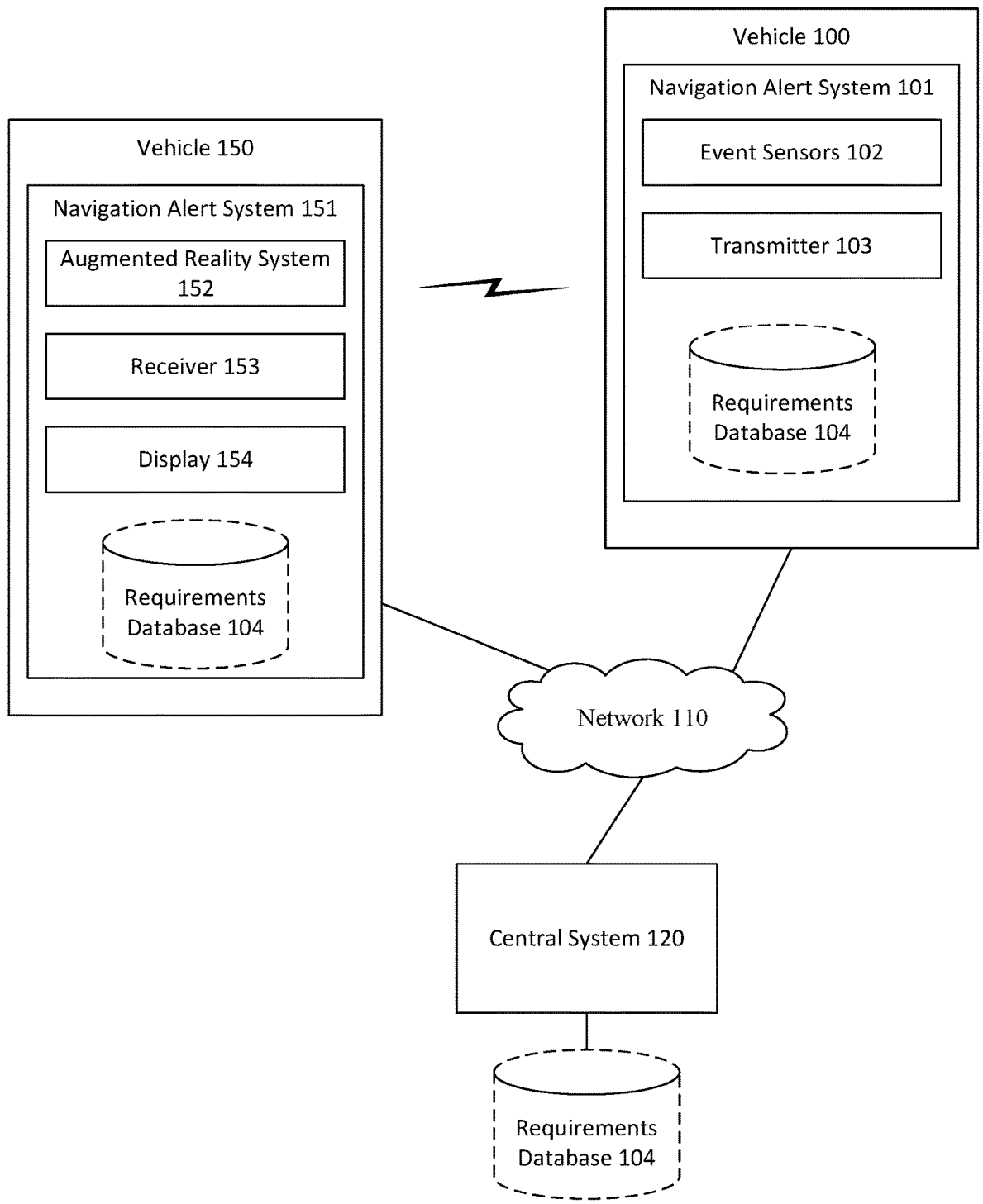
FIG. 1 illustrates a system for identifying vehicle navigation requirements using augmented reality according to some embodiments.

FIG. 1 illustrates a system for identifying vehicle navigation requirements using augmented reality according to some embodiments. In some embodiments, the system includes a first vehicle 100 with a first navigation alert system 101. The first navigation alert system 101 includes one or more event sensors 102, a set of transmitters 103, and optionally a requirements database 104. The event sensors 102, implemented in hardware, software, or a combination of hardware and software, capture events and their corresponding states related to the operation of the first vehicle 100. The transmitter 103 is configured to send signals or messages. The requirements database 104 is a repository of vehicle navigation requirements associated with certain events and locations. The system further includes a second vehicle 150 with a second navigation alert system 151. The second alert system 151 includes an augmented reality (AR) system 152, a receiver 153, and a display 154 compatible with the AR system 152. The display 154 is either integrated with the other systems of the second vehicle 150 (e.g. vehicle windshield) or is a separate device coupled to the AR system 151 (e.g. AR glasses). The receiver 153 is configured to receive signals or messages, such as from the transmitter 103 of the vehicle 100. Optionally, instead of the requirements database 104 residing with the vehicle 100, the requirements database 104 can instead reside with the vehicle 150. The transmitter 103 and receiver 153 communicate directly, via radio, WiFi, Bluetooth, near field communication (NFC), and other wireless communications mediums. In an alternative embodiment, the vehicles 100 and 150 communicate through a central system 120 over a network 110 and through an application programming interface (API), where the requirements database 104 resides at the central system 120. The central system 120 may be implemented by a server, web server, cloud service, etc.

Figure 2:
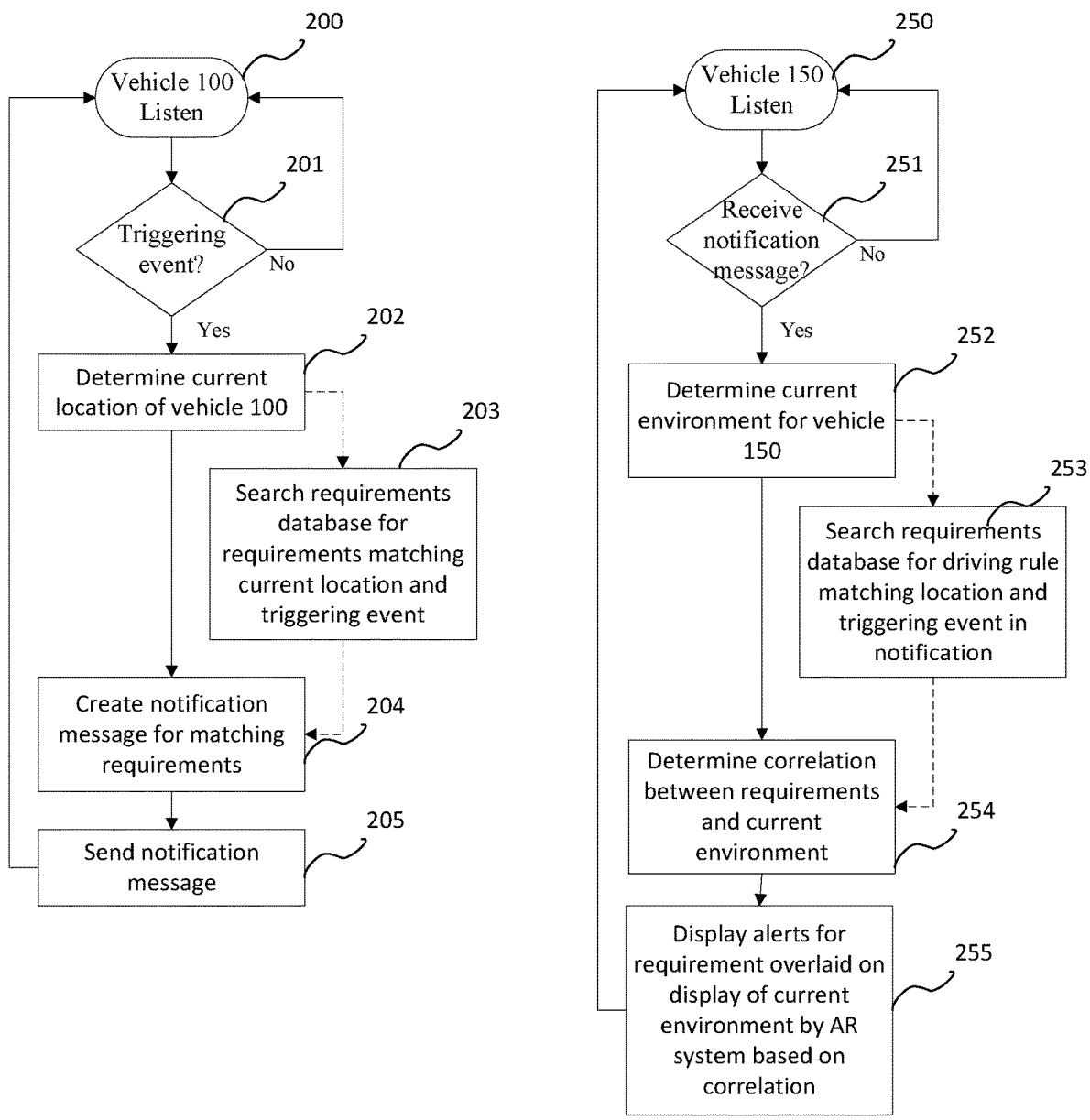
FIG. 2 illustrates a method for identifying vehicle navigation requirements using augmented reality according to some embodiments.

FIG. 2 illustrates a method for identifying vehicle navigation requirements using augmented reality according to some embodiments. Referring to both FIGS. 1 and 2, event sensors 102 of the first vehicle 100 are placed in a listening state (200) to listen for certain events concerning the operation of the vehicle 100. The first navigation alert system 101 of the first vehicle 100 is configured such that certain events trigger the following process according to some embodiments. When an event sensor 102 determines that a triggering event has occurred (201), the first navigation alert system 101 determines a current location of the vehicle 100 (202). When the requirements database 104 resides with the first vehicle 100, the first navigation alert system 101 searches the requirements database 104 for navigation requirements matching the current location and the triggering event (203). The first navigation requirements system 101 creates a notification message for the matching navigation requirements (204) and sends the notification using the transmitter 103 (205).

The second alert system 151 of the second vehicle 150 is placed in a listening state (250) to listen for messages. When the receiver 153 receives the notification message transmitted by the first navigation alert system 101 (251), the second navigation alert system 151 determines the current environment for the vehicle 150 (252). The current environment includes at least: the current location of the second vehicle 150; the roads and/or terrain surrounding the current location of the second vehicle 150; and direction in which the second vehicle 150 is traveling on the roads or terrain. In some embodiments, the current environment is obtained from the AR system 152. When the requirements database 104 resides with the first vehicle 100, the notification message includes the navigation requirements to which the first navigation alert system 101 matched the current location of the first vehicle 100 and the triggering event. When the requirements database 104 instead resides with the second vehicle 150, the notification message includes the current location of the first vehicle 100 and the triggering event, and the second navigation alert system 151 performs the search of the requirements database 104 for the navigation requirements matching the current location and the triggering event (253). The second navigation alert system 151 determines the correlation between the navigation requirements and the current environment (254). For example, the second navigation alert system 151 determines the areas in the current environment into which the second vehicle 150 is allowed or prohibited to navigate according to the matching navigation requirement. The AR system 152 of the second navigation alert system 151 then displays one or more alerts for the navigation requirement on the display 154 overlaid on a display of the current environment based on the correlation (255), such as by overlaying a red color over areas the second vehicle 150 is prohibited from entering and a green color over areas the second vehicle 150 is allowed to enter according to the matching navigation requirement.

For example, assume that the first vehicle 100 is a school bus and the second vehicle 150 is a passenger car. Assume also that the first navigation alert system 101 of the school bus is configured such that the activation of yellow blinking lights on the school bus is a first triggering event and the activation of red blinking lights and extension of a stop arm on the school bus is a second triggering event. When the event sensors 102 in the school bus senses that the yellow blinking lights on the school bus has been activated (201), the first navigation alert system 101 determines a current location of the school bus (202), such as by use of a GPS system. Assume that the requirements database 104 resides at the school bus. The first navigation alert system 101 searches the requirements database 104 for navigation requirements matching the current location of the school bus and the activation of the yellow blinking lights (203). Assume that a matching navigation requirement is found, where the requirement indicates that, for the current location of the school bus, it is illegal for vehicles to pass the school bus from behind and vehicles traveling in the opposite direction must slow to 20 miles per hour or less. The first navigation alert system 101 creates a notification message that includes the metes and bound of the matching navigation requirement (204) and sends the notification message using the transmitter 103 (205).

When the receiver 153 of the car receives the notification message (251), the second navigation alert system 151 determines the current environment for the car (252). Assume that the current environment indicates that the car is behind the school bus and is traveling in the same direction as the school bus. The second navigation alert system 151 determines a correlation between the navigation requirement and the car's current environment (254). For example, the second navigation alert system 151 determines the area of lanes next to the school bus are likely paths for passing the school bus. The AR system 152 displays these lanes overlaid with a red color to alert the driver that the car is not to pass the school bus (255).

Assume that a second car also receives the notification message (251). Assume that the navigation alert system of the second car determines that the second car is approaching the school bus from the opposite direction (252). The navigation alert system of the second car determines the correlation between the navigation requirement and the second car's current environment to be a limit of 20 miles per hour speed when traveling past the school bus (254). The AR system of the second car displays the 20 miles per hour speed limit overlaid with the current environment on the display of the second car (255).

Assume that the school bus then activates the blinking red lights and extends the stop arm. When the event sensors 102 in the school bus senses that these events (201), the first navigation alert system 101 determines a current location of the school bus (202) and searches the requirements database 104 for navigation requirements matching the current location of the school bus and the activation of the red blinking lights with an extended stop arm (203). Assume that a matching navigation requirement is found, where the requirement indicates that, for the current location of the school bus, vehicles from all directions must stop until the red lights stop blinking and the stop arm is retracted. The first navigation alert system 101 creates a notification message that includes the metes and bound of the matching navigation requirement (204) and sends the notification message using the transmitter 103 (205).

When the receiver 153 of the car receives the notification message (251), assume that the second navigation alert system 151 determines the car is behind the school bus and is traveling in the same direction as the school bus. The second navigation alert system 151 determines that the correlation between the navigation requirement and the car's current environment is for the car to stop moving (254). The AR system 152 displays areas between the school bus and the car overlaid with a red color to alert the driver that the car is not to enter these areas (255). Optionally, the AR system 152 may further display a graphic (such as a stop sign) or text to alert the driver that the car must be in a complete stop.

Assume that the school bus and the car are in a different jurisdiction, where the navigation requirement matching the current location of the school and the activation of the red blinking lights with an extended stop arm indicates that vehicles in all directions must stop at least 20 meters away from the school bus. In this example, the notification message sent by the first navigation alert system includes the 20-meter requirement. The second navigation alert system 151 of the car, using the strength of the communication signal between the transmitter 103 of the first navigation alert system 101 and the receiver 153 of the second navigation alert system 151, determines that the car is 25 meters behind the school bus. The AR system 152 displays the area 20 meters behind the school overlaid with a red color to alert the driver that the car is not to enter this area.

In the manner described above, vehicle drivers are alerted to the navigation requirements applicable in particular locations or jurisdictions. The embodiments described herein can also be applied to other types of vehicles or objects without departing from the spirit and scope of the present invention. The other types include but are not limited to: police vehicles; emergency response vehicles; road side constructions; road hazards; road repair; train tracks; barriers; and tow trucks.

Figure 3:
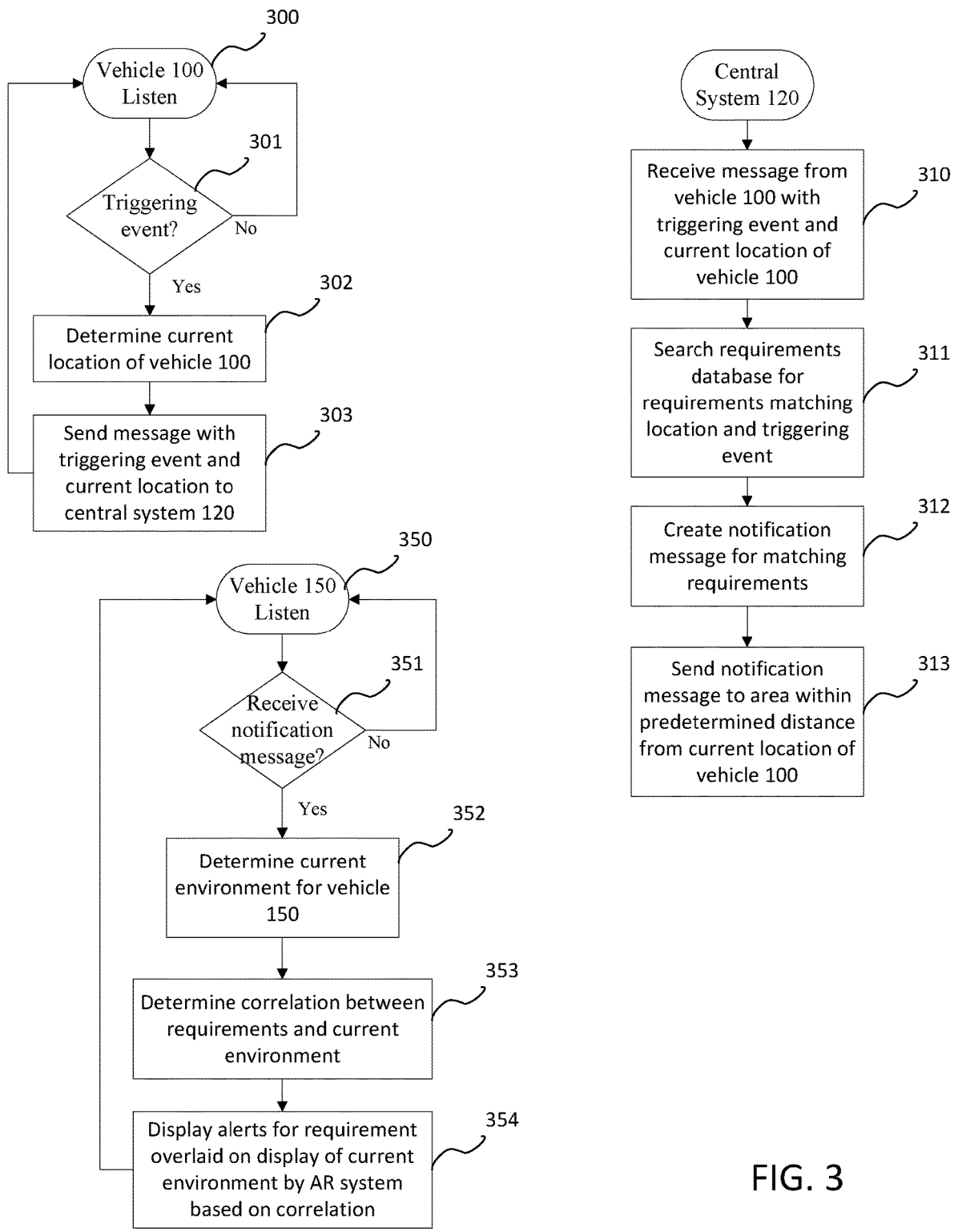
FIG. 3 illustrates a method for identifying vehicle navigation requirements using augmented reality and a central system according to some embodiments.

FIG. 3 illustrates a method for identifying vehicle navigation requirements using augmented reality and a central system according to some embodiments. As set forth above with reference to FIG. 1, in an alternative embodiment, the vehicles 100 and 150 communicate through a central system 120 over a network 110, where the requirements database 104 resides at the central system 120. In this embodiment, event sensors 102 of the first vehicle 100 are placed in a listening state (300) to listen for certain events concerning the operation of the vehicle 100. The first navigation alert system 101 is configured such that certain events trigger the following process according to some embodiments. When an event sensor 102 determines that a triggering event has occurred (301), the first navigation alert system 101 determines a current location of the vehicle 100 (302). The first navigation alert system 101 creates a message with the triggering event and the current location of the vehicle 100 and sends the message to the central system 120 over the network 110 (303).

The central system 120 receives the message from the vehicle 100 with the triggering event and the current location of the vehicle 100 (310). The central system 120 searches the requirements database 104 for navigation requirements matching the current location and the triggering event (311). The central system 120 creates a notification message for the matching navigation requirement (312) and sends or broadcasts the notification message over the network 110 to an area within a predetermined distance from the current location of the vehicle 100 (313). The area is configurable based on parameters of the matching navigation requirement.

The second navigation system 151 of the vehicle 150 is placed in a listening state (350) to listen for messages. When the vehicle 150 travels into the area, the receiver 153 receives the notification message sent by the central system 120 (351). In response, the second navigation alert system 151 determines the current environment for the vehicle 150 (352). The second navigation alert system 151 determines the correlation between the navigation requirements and the current environment (353). The AR system 152 of the second navigation alert system 151 then displays one or more alerts for the navigation requirement on the display 154 overlaid on a display of the current environment based on the correlation (354).

Optionally, instead of displaying the alerts via the AR system 152, the alerts may instead be sent to and displayed on another navigation system. Other navigation systems include, but are not limited to, GPS systems, mobile navigation applications (e.g. Google Maps™, Waze™, etc.), and other non-AR navigation systems. For navigation systems that display a virtual representation of the current environment, the alerts are overlaid on this virtual representation in the same or similar manner as described above. For example, the second navigation alert system 151 sends the alert to a GPS system. The GPS system switches from a map view to a virtual roadway view that includes a representation of a school bus and overlays a red color over the area in which the car is not to enter. In some embodiments, the second navigation system 151 is configured to send the alerts to the other navigation system. In other embodiments, the second navigation system 151 first determines that the AR system 152 is not available to display alerts, and in response, sends the alerts to the other navigation system.

Figure 4:
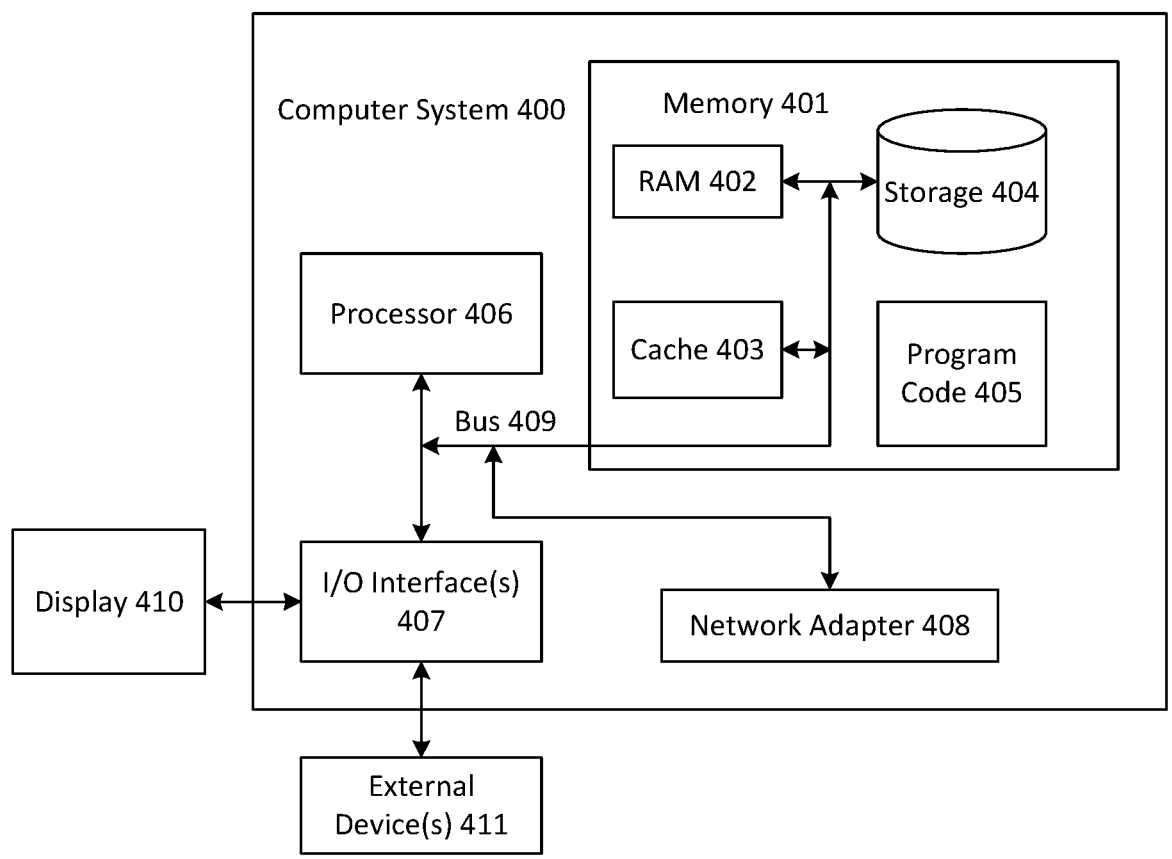
FIG. 4 illustrates a computer system, one or more of which is used to implement the embodiments of the present invention.

FIG. 4 illustrates a computer system, one or more of which is used in implementing some embodiments of the present invention. The computer system 400 is operationally coupled to a processor or processing units 406, a memory 401, and a bus 409 that couples various system components, including the memory 401 to the processor 406. The bus 409 represents one or more of any of several types of bus structure, including a memory bus or memory controller, a peripheral bus, an accelerated graphics port, and a processor or local bus using any of a variety of bus architectures. The memory 401 may include computer readable media in the form of volatile memory, such as random access memory (RAM) 402 or cache memory 403, or non-volatile storage media 404. The memory 401 may include at least one program product having a set of at least one program code module 405 that are configured to carry out the functions of embodiment of the present invention when executed by the processor 406. The computer system 400 may also communicate with one or more external devices 411, such as a display 410, via I/O interfaces 407. The computer system 400 may communicate with one or more networks via network adapter 408.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for identifying vehicle navigation requirements using augmented reality comprising:
    receiving, by a first navigation alert system of a first vehicle, a notification message associated with a second vehicle, the notification message corresponding to a set of navigation requirements matching a current location of the second vehicle and a set of events concerning an operation of the second vehicle;
    in response to receiving the notification message, determining, by the first navigation alert system, a current environment for the first vehicle;
    determining, by the first navigation alert system, a correlation between the set of navigation requirements and the current environment; and
    displaying, by an augmented reality system of the first vehicle, a set of alerts for the first vehicle based on the set of navigation requirements, the set of alerts overlaid on a display of the current environment based on the correlation, wherein the displayed set of alerts includes an overlay indicating an area proximate to the second vehicle having restrictions for operation of the first vehicle.

2. The method of claim 1, further comprising:
    determining, by a second navigation alert system of the second vehicle, the set of events;
    in response to the determination of the set of events, determining, by the second navigation alert system, the current location of the second vehicle;
    creating, by the second navigation alert system, the notification message corresponding to the set of navigation requirements matching the current location of the second vehicle and the set of events; and
    sending, by the second navigation alert system, the notification message.

3. The method of claim 2, wherein the creating of the notification message comprises:
    searching, by the second navigation alert system, a requirements database for the set of navigation requirements matching the current location of the second vehicle and the set of events; and
    creating, by the second navigation alert system, the notification message to comprise the set of navigation requirements.

4. The method of claim 1, wherein the notification message received by the first navigation alert system comprises the current location of the second vehicle and the set of events, wherein in response to receiving the notification message by the first navigation alert system, the method comprises:
    searching, by the first navigation alert system, a requirements database for the set of navigation requirements matching the current location of the second vehicle and the set of events.

5. The method of claim 1, further comprising:
determining, by a second navigation alert system of the second vehicle, the set of events;
in response to the determination of the set of events, determining, by the second navigation alert system, the current location of the second vehicle;
sending, by the second navigation alert system over a network, a message comprising the current location of the second vehicle and the set of events to a central system.

6. The method of claim 5, further comprising:
receiving, by the central system, the message from the second navigation alert system;
searching, by the central system a requirements database for the set of navigation requirements matching the current location of the second vehicle and the set of events;
creating, by the central system, the notification message comprising the set of navigation requirements; and
sending, by the central system over the network, the notification message to an area within a predetermined distance from the current location of the second vehicle.

7. The method of claim 1, wherein the overlay highlights the area proximate to the second vehicle having restrictions for operation of the first vehicle in a first manner showing boundaries of the area.

8. The method of claim 7, wherein the overlay highlights a second area having no restrictions for operation of the first vehicle based on the correlation in a second manner.

9. The method of claim 7, wherein the current environment includes the current location of the first vehicle, a set of roads surrounding the first vehicle and a direction of travel of the first vehicle and wherein a set of boundaries of the area is dependent on the direction that the first vehicle is travelling with respect to the second vehicle and the current location of the second vehicle.

10. A computer program product for identifying vehicle navigation requirements using augmented reality, the computer program product comprising computer readable storage media having program instructions embodied therewith, the program instructions executable by one or more processors to cause the one or more processors to:
receive, by a first navigation alert system of a first vehicle, a notification message associated with a second vehicle, the notification message corresponding to a set of navigation requirements matching a current location of the second vehicle and a set of events concerning an operation of the second vehicle;
in response to receiving the notification message, determine, by the first navigation alert system, a current environment for the first vehicle;
determine, by the first navigation alert system, a correlation between the set of navigation requirements and the current environment; and
display, by an augmented reality system of the first vehicle, a set of alerts for the first vehicle based on the set of navigation requirements, the set of alerts overlaid on a display of the current environment based on the correlation, wherein the displayed set of alerts includes an overlay indicating an area proximate to the second vehicle having restrictions for operation of the first vehicle.

11. The computer program product of claim 10, wherein the one or more processors are further caused to:
determine, by a second navigation alert system of the second vehicle, the set of events;
in response to the determination of the set of events, determine, by the second navigation alert system, the current location of the second vehicle;
create, by the second navigation alert system, the notification message corresponding to the set of navigation requirements matching the current location of the second vehicle and the set of events; and
send, by the second navigation alert system, the notification message.

12. The computer program product of claim 11, wherein in the creating of the notification message, the one or more processors are further caused to:
search, by the second navigation alert system, a requirements database for the set of navigation requirements matching the current location of the second vehicle and the set of events; and
create, by the second navigation alert system, the notification message to comprise the set of navigation requirements.

13. The computer program product of claim 10, wherein the notification message received by the first navigation alert system comprises the current location of the second vehicle and the set of events, wherein in response to receiving the notification message by the first navigation alert system, the one or more processors are further caused to:
search, by the first navigation alert system, a requirements database for the set of navigation requirements matching the current location of the second vehicle and the set of events.

14. The computer program product of claim 10, wherein the one or more processors are further caused to:
determine, by a second navigation alert system of the second vehicle, the set of events;
in response to the determination of the set of events, determine, by the second navigation alert system, the current location of the second vehicle;
send, by the second navigation alert system over a network, a message comprising the current location of the second vehicle and the set of events to a central system;
receive, by the central system, the message from the second navigation alert system;
search, by the central system a requirements database for the set of navigation requirements matching the current location of the second vehicle and the set of events;
create, by the central system, the notification message comprising the set of navigation requirements; and
send, by the central system over the network, the notification message to an area within a predetermined distance from the current location of the second vehicle.

15. A system comprising:
a first vehicle comprising a first navigation alert system comprising an augmented reality system, the first navigation alert system configured to:
receive a notification message associated with a second vehicle, the notification message corresponding to a set of navigation requirements matching a current location of the second vehicle and a set of events concerning an operation of the second vehicle;
in response to receiving the notification message, determine a current environment for the first vehicle;
determine a correlation between the set of navigation requirements and the current environment; and
display, by an augmented reality system, a set of alerts for the first vehicle based on the set of navigation requirements, the set of alerts overlaid on a display of the current environment based on the correlation, wherein the displayed set of alerts includes an overlay indicating an area proximate to the second vehicle having restrictions for operation of the first vehicle.

16. The system of claim 15, further comprising:
a second vehicle comprising a second navigation alert system configured to:
  determine the set of events;
  in response to the determination of the set of events, determine the current location of the second vehicle;
  create the notification message corresponding to the set of navigation requirements matching the current location of the second vehicle and the set of events; and
  send the notification message.

17. The system of claim 16, wherein in creating of the notification message, the second navigation alert system is configured to:
  search a requirements database for the set of navigation requirements matching the current location of the second vehicle and the set of events; and
  create the notification message to comprise the set of navigation requirements.

18. The system of claim 15, wherein the notification message received by the first navigation alert system comprises the current location of the second vehicle and the set of events, wherein in response to receiving the notification message, the first navigation alert system is configured to:
  search a requirements database for the set of navigation requirements matching the current location of the second vehicle and the set of events.

19. The system of claim 15, wherein the second navigation alert system is further configured to:
  determine the set of events;
  in response to the determination of the set of events, determine the current location of the second vehicle;
  send over a network a message comprising the current location of the second vehicle and the set of events to a central system.

20. The system of claim 19, further comprising:
the central system configured to:
  receive the message from the second navigation alert system;
  search a requirements database for the set of navigation requirements matching the current location of the second vehicle and the set of events;
  create the notification message comprising the set of navigation requirements; and
  send over the network the notification message to an area within a predetermined distance from the current location of the second vehicle.

* * * * *